(12) United States Patent
Chraim et al.

(10) Patent No.: US 11,616,708 B1
(45) Date of Patent: Mar. 28, 2023

(54) ESTIMATING END-TO-END NETWORK TRAFFIC DEMAND AND LOSS

(71) Applicant: Amazon Technologies, Inc., Seattle, WA (US)

(72) Inventors: Fabien Chraim, Tucson, AZ (US); John William Evans, Frome (GB)

(73) Assignee: Amazon Technologies, Inc., Seattle, WA (US)

( * ) Notice: Subject to any disclaimer, the term of this patent is extended or adjusted under 35 U.S.C. 154(b) by 192 days.

(21) Appl. No.: 16/889,358

(22) Filed: Jun. 1, 2020

(51) Int. Cl.
*G06F 15/173* (2006.01)
*H04L 43/0829* (2022.01)
*H04L 45/00* (2022.01)
*H04L 41/046* (2022.01)
*H04L 43/12* (2022.01)
*H04L 45/021* (2022.01)

(52) U.S. Cl.
CPC ........ *H04L 43/0829* (2013.01); *H04L 41/046* (2013.01); *H04L 43/12* (2013.01); *H04L 45/021* (2013.01); *H04L 45/72* (2013.01)

(58) Field of Classification Search
CPC ... H04L 43/0829; H04L 43/12; H04L 45/021; H04L 41/046
USPC ........................................ 709/238, 223, 224
See application file for complete search history.

(56) References Cited

U.S. PATENT DOCUMENTS

| | | | |
|---|---|---|---|
| 7,782,796 B2* | 8/2010 | Haley | H04L 43/0882 370/254 |
| 10,671,520 B1* | 6/2020 | Rodrigues | H04L 41/0806 |
| 2019/0089639 A1* | 3/2019 | Dhanabalan | H04L 47/2458 |
| 2020/0014619 A1* | 1/2020 | Shelar | H04L 45/14 |
| 2022/0038359 A1* | 2/2022 | Svennebring | H04L 41/147 |

* cited by examiner

*Primary Examiner* — Lan Dai T Truong
(74) *Attorney, Agent, or Firm* — Klarquist Sparkman, LLP

(57) ABSTRACT

Packet transmission rate and packet drop rate for discrete network devices in a network are used to estimate end-to-end traffic demand and loss in the network. Data regarding the packet transmission rate and drop rate are passively collected for each network device and transmitted to a network monitoring unit. The network monitoring unit compiles the data and generates a series of simultaneous equations that represent traffic demand and loss between the discrete network devices along the paths connecting respective source-destination pairs. By determining an optimal solution to the simultaneous equations, an estimate of end-to-end traffic loss and corresponding traffic demand, which takes into account packet loss at each network device, can be generated for each source-destination pair. The optimal solution can be formed as a traffic matrix, which aggregates source-to-destination traffic demands, and a loss matrix, which aggregates source-to-destination traffic losses.

15 Claims, 10 Drawing Sheets

ESTIMATING END-TO-END NETWORK TRAFFIC DEMAND AND LOSS

BACKGROUND

Large computer networks, often used in cloud computing or other applications, may contain hundreds or thousands of network devices of several types, such as switches, routers, and hubs. Data from a source endpoint (e.g., a host computer or a network device connecting to another network) travels to a destination endpoint via paths defined by links between multiple devices of the network. In packet-switched networks, the data is formatted into units, termed packets, that travel along the paths between endpoints. Loss of traveling packets is a key metric of service performance of the network. In particular, knowledge as to whether network packet loss is within the bounds of expectations provides an indication of the health of the network as well as whether an operator of the network is fulfilling service performance commitments to users or customers of the network. Knowledge of packet loss can also assist the network operator in identifying network performance issues that require repair.

In existing network systems, packet loss can be monitored by active monitoring or passive monitoring. In active monitoring, probe packets are sent end-to-end across the network. The number of probe packets successively delivered to a destination endpoint from a source endpoint are measured to provide a measure of packet loss along that source-destination path. However, such probe packets are sent at a relatively low rate compared to the real network traffic, and thus this approach under-samples the actual traffic and corresponding loss. As a result, active monitoring cannot provide an accurate method to measure end-to-end loss.

In contrast, passive monitoring relies on statistics of packet transmission and loss reported by each network device. In existing systems, the data from passive monitoring can be used to compile a traffic matrix, which represents the volume of traffic between all possible pairs of source and destinations in the network. While passive monitoring provides an accurate measure of the loss rate at each network device, the information is limited to the corresponding network device. Thus, passive monitoring does not currently provide a measure of end-to-end path loss that would be experienced by traffic between a particular source-destination pair. Moreover, existing systems that determine traffic matrices using passive monitoring data fail to account for packet loss and thus can lead to an erroneous determination of the volume of traffic.

DETAILED DESCRIPTION

Figure 1:
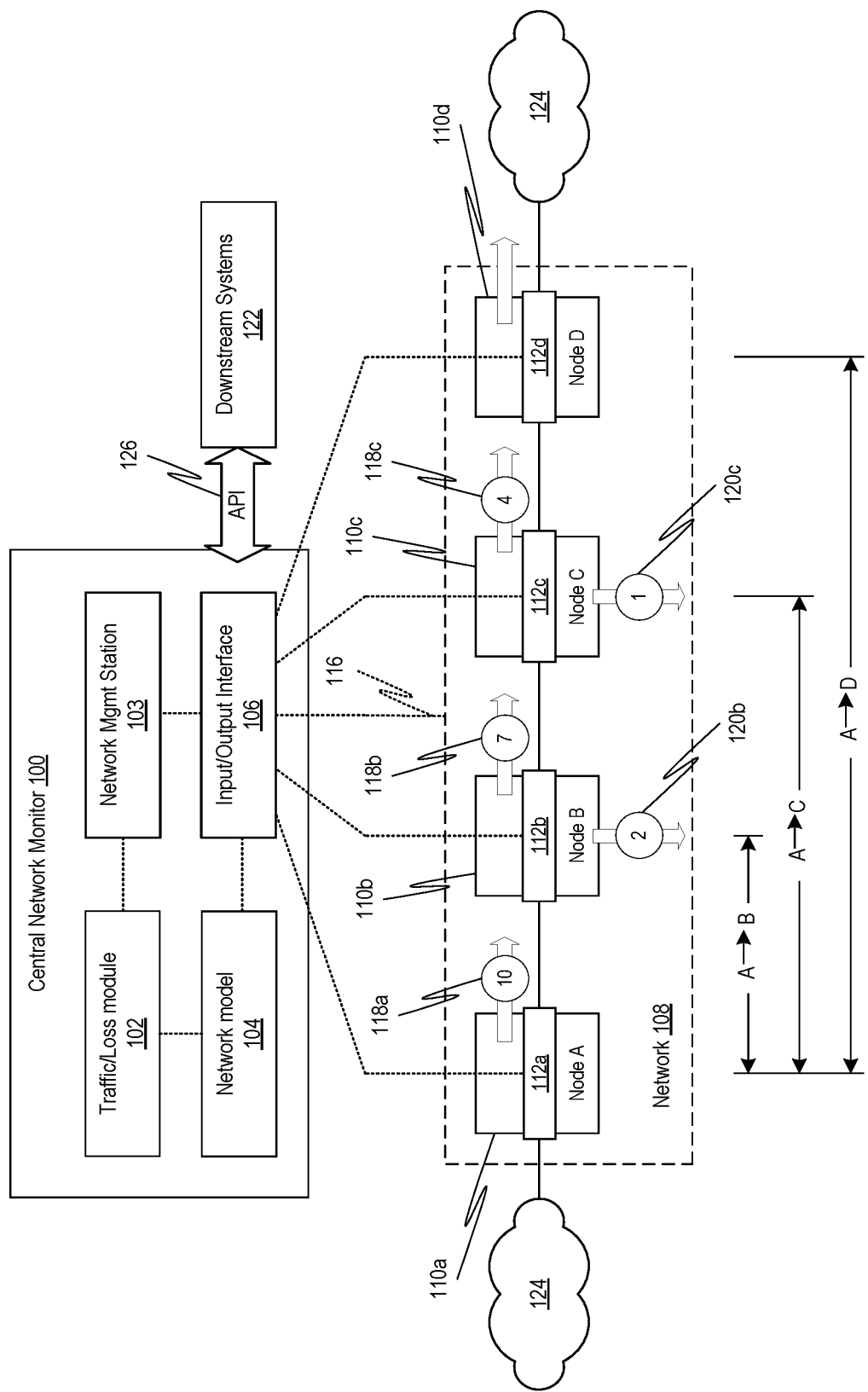
FIG. 1 is a simplified schematic diagram of a system for estimating end-to-end network traffic demand and loss, according to one or more embodiments of the disclosed subject matter.

Packet transmission rate and packet drop rate for discrete network devices in a computer network are used to estimate end-to-end traffic demand and loss in the network. Data regarding the packet transmission rate and drop rate are passively collected for each network device and transmitted to a network monitoring unit. The network monitoring unit compiles the data and generates a series of simultaneous equations that represent traffic demand and loss between the discrete network devices along the paths connecting respective source-destination pairs. By determining an optimal solution to the simultaneous equations, an estimate of end-to-end traffic loss and corresponding traffic demand, which takes into account packet loss at each network device, can be generated for each source-destination pair. The optimal solution can be formed as a traffic matrix, which aggregates source-to-destination traffic demands, and a loss matrix, which aggregates source-to-destination traffic losses. The resulting matrices can be used by an operator of a network to take corrective action, such as notifying a particular customer of issues with data transmission to a particular destination, taking out of service network paths between particular source-destination pairs, or identifying particular network paths that require repair or further troubleshooting.

In a computer network with a number, N, of nodes, and a number, P, of paths between pairs of source-destination endpoints, a routing matrix, R, can be defined as:

$$R \in \mathbb{R}^{N \times P}.$$

Alternatively, since each source-destination pair may have multiple paths, a triplet formed as (source, destination, path) can be defined for each source-destination pair. As used herein, source-destination refers to in an ingress node and an egress node, respectively, but they need not be the original source or ultimate destination for a particular packet. Similarly, the use of end-to-end path refers to the path between the source-destination pair, which may be constituted by several links between nodes to connect the source to the destination; however, the path that a packet takes within a network or between networks may extend beyond the particular end-to-end path. Each node can be a network device (e.g., router or switch), an edge of the network, one of multiple interfaces of the network device, an aggregation of different network devices or device interfaces according to hierarchy, etc. For example, the results of route-tracing functions of an active monitoring module of the network (e.g., traceroutes or tracert) for each source-destination pair can be aggregated to form the routing matrix. Alternatively or additionally, the routing matrix can be formed using the topology (e.g., the location of network devices and physical connections between network devices) and routing logic (e.g., routing or forwarding rules of the network, such as a routing table or forwarding table of each network device). Based on the topology and routing logic, end-to-end paths through the network between source-destination pairs can be determined, for example, via simulation or algorithm.

The traffic-loss matrix, s, can be defined as $s = [d, l] \in \mathbb{R}^{P \times 2}$, where d is a traffic matrix and l is a loss matrix. In particular, the traffic matrix is a vector of the traffic demand (e.g., in packets per minute), with each entry corresponding to a particular path between a pair of source-destination endpoints. Similarly, the loss matrix is a vector of the traffic loss (e.g., in packets per minute), with each entry corresponding to a particular path between a pair of source-destination endpoints. For example, in a network with a number, n, of source endpoints and a number, m, of destination endpoints, the traffic matrix (e.g., vector) may take the form of:

$$d = \begin{bmatrix} D_{1,1} \\ \vdots \\ D_{n,m} \end{bmatrix},$$

where $D_{n,m}$ represents the traffic demand for the path, P, between the n-th source and the m-th destination. For example, the loss matrix (e.g., vector) may take the form of:

$$l = \begin{bmatrix} L_{1,1} \\ \vdots \\ L_{n,m} \end{bmatrix},$$

where $L_{n,m}$ represents the traffic loss for the path, P, between the n-th source and the m-th destination. Each network device in the network monitors packet loads and losses for its interfaces and periodically reports such data to a central network monitor. Using the monitoring data, a matrix, t, of packet load and packets lost for each link can be formed as:

$$t = [t,e] \in \mathbb{R}^{N \times 2},$$

where t is a vector of the traffic loads per node and e is a vector of packets lost (e.g., dropped or not otherwise sent due to an error) per node.

Figure 2:
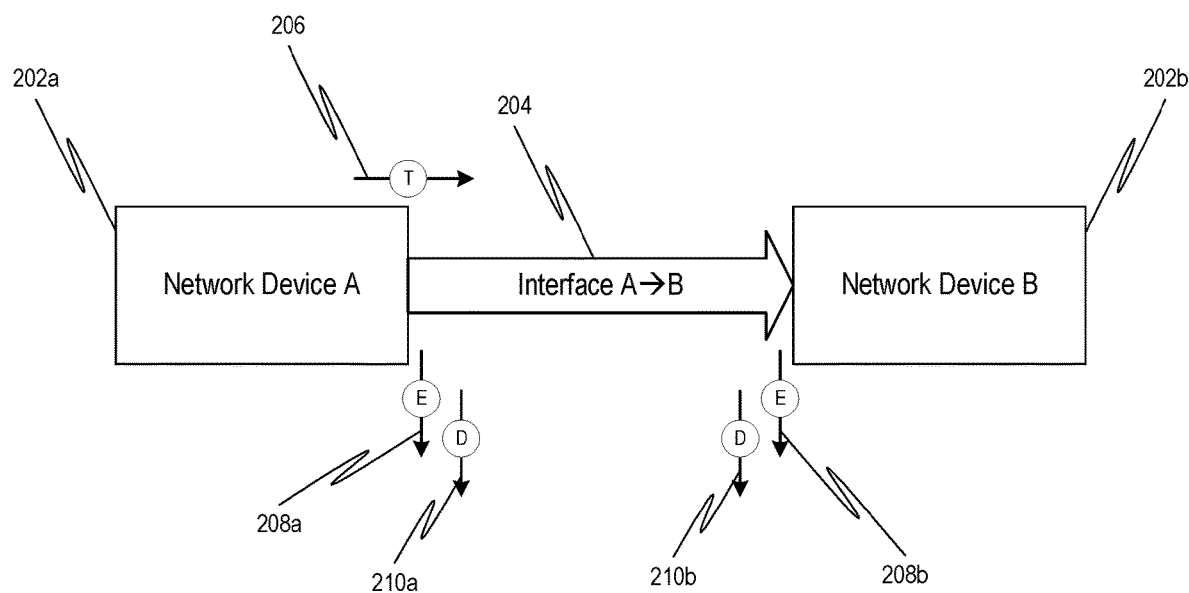
FIG. 2 shows details of packet transmission and loss via an interface connecting network devices in the network.

FIG. 2 illustrates transmission 206 of packets between a pair of network devices. Physical interface 204 is an entity connecting the two network devices 202a, 202b. At output end of network device 202a, interface 204 may drop a number of packets 210a and/or may fail to transmit a number of packets 208a. Meanwhile, at input end of network device 202b, interface 204 may drop an additional number of packets 210b and/or may fail to transmit an additional number of packets 208b. In some embodiments, the vector e captures the number of packets lost (e.g., dropped or not sent due to an error) based on output metrics of the transmitting network device (e.g., 208a+210a). Alternatively, in some embodiment, the vector e captures the number of packets lost based on input and output metrics at either end of the interface (e.g., 208a+210a+208b+210b).

While the routing matrix, R, and the link load/drop matrix, t, are known, the end-to-end traffic-loss matrix, s, remains unknown. Moreover, the underlying system of simultaneous equations is generally under-determined and may have many potential solutions. The estimation problem can thus be formulated as determining an optimal solution for end-to-end traffic demands and losses that, when combined with the end-to-end routing through the network, yields (or least approximates) the measured traffic and loss at each node of the network. In other words, the traffic-loss matrix, s, is determined such that Rs=t.

To determine the optimal solution for the traffic-loss matrix, s (and its underlying component vectors, the traffic matrix, d, and the loss matrix, l), a gravity model can be used to derive a prior for s. For a particular source-destination pair n,m and set of endpoints, k:

$$s_{nm} = [d_{nm}, l_{nm}],$$

$$d_{nm} = \frac{\sum_i t_{ni} \times \sum_j t_{jm}}{\sum_k t_k}, \text{ and}$$

$$l_{nm} = d_{nm} \times \sum_i e_{ni}.$$

Assuming that the passive monitoring measurements from the nodes contain white noise with a zero mean and unit covariance and that the estimated s is normally distributed with respect to the mean of the prior and with sigma square as the standard deviation (e.g., $s \sim N(s^{(p)}, \sigma^2 I)$, the optimization problem can be defined as:

$$\operatorname*{argmin}_{s} \|Rs - t\|_2^2 - \sigma^{-2} \|s - s^{(p)}\|_2^2,$$

where $\sigma$ is a regularization constant. Alternatively, and without the assumptions above, the optimization problem can be described as:

$$\operatorname*{argmin}_{s} \|Rs - t\|_2^2 - \sigma^{-2} D(s\|s^{(p)}),$$

s.t.

s.t.
s is a positive semi-definite matrix.
The Kullback-Leibler (KL) divergence between the estimated traffic-loss matrix, s, and its prior can be minimized, for example, similar to an expectation-maximization (EM) approach in an iterative scaling method.

FIG. 1 illustrates an exemplary system 100 for estimating end-to-end traffic demand and loss in a computer network 108. The computer network can be a geographically distributed collection of nodes 110 interconnected by communication links and segments for transporting data between end nodes or endpoints (e.g., node A 110a and node D 110d), such as personal computers and workstations, connections to an external network 124 (e.g., via border nodes), or other devices, such as sensors, etc. Each node 110 can be a network device, for example, a network router or switch. Alternatively, each node 110 can represent an interface of a network device or an aggregation of interfaces of network devices. As used herein, interfaces refer to ports of the network device that provide connectivity to other devices of the network. As such, each network device may have multiple interfaces, for example, input ports and output ports. Although only four nodes 110a-110d are shown in FIG. 1 for simplicity of description, it will be appreciated that any number of nodes 110 can be provided in network 108. Indeed, in practical implementations, network 108 would include a large number of nodes 110, for example, on the order of hundreds or thousands.

Network 108 and/or external network 124 can be any type of network, such as a local area network (LAN) or a wide area network (WAN). LANs typically connect nodes over dedicated private communication links located in the same general physical location, such as a building or campus.

WANs typically connect geographically dispersed nodes over long-distance communication links, such common carrier telephone lines, optical light paths, Synchronous Optical Networks (SONET), Synchronous Digital Hierarchy (SDH) links, or Power Line Communications (PLC), and so forth. Various network architectures, such as Clos networks, can be used. For example, network 108 may constitute a LAN while external network 124 constitutes a WAN or an intervening network that connects network 108 to the Internet.

Each node 110a-110d can include a respective agent 112a-112d that monitors packets transmitted and packets dropped by the node. For example, the agents 112a-112d can be respective software modules operating on a network device. Alternatively, agents 112a-112d can be separate devices coupled to the respective node for monitoring performance thereof. The agents 112a-112d are configured to compile and periodically (e.g., every minute) transmit data regarding the packets transmitted and dropped by the respective node 110a-110d to a network management station 103 of network monitoring system 100 via respective communication links and input/output interface 106. In some embodiments, the agents 112a-112d are configured to transmit the data to network management station 103 in response to a polling request from the network management station 103. For example, the agents 112a-112d and network management system 103 can operate in accordance with Simple Network Management Protocol (SNMP). In other embodiments, the agents 112a-112d are configured to transmit the data to network management station 103 automatically without the need for any polling by network management station 103. The automatic transmission of data from the agents 112a-112d may be continuous or according to a predetermined schedule. For example, communication between agents 112a-112d and network management system 103 can be by streaming telemetry.

In addition to the network management station 103 and input/output interface 106, the network monitoring system 100 can include a network modeling module 104. The network modeling module 104 is configured to generate a model of paths that different traffic demands would take from source to destination. For example, the model produced by module 104 takes the form of a routing matrix, R. In some embodiments, the networking modeling module 104 receives information regarding the physical topology of the network and routing logic of the network to determine the paths of data packet transmission, for example, via simulation or algorithm that steps through from each source to each destination based on the routing logic. The networking modeling module 104 can receive the topology and/or logic information from network 108, for example, via a separate communication link 116 with a network-wide administration device (not shown) and/or from each node 110a-110d via the respective data communication links. Alternatively or additionally, the network modeling module 104 is configured to perform active probing of network 108 to determine packet travel paths from each source to each destination. For example, the network modeling module 104 can employ a route-tracing function (e.g., traceroutes or tracert) for each source-destination pair.

The network monitoring system 100 can further include a traffic/loss module 102. The traffic/loss module 102 receives data regarding packets transmitted and dropped at each node 110 from network management station 103 and the model of paths from network modeling module 104. Using the data and the model, traffic/loss module 102 estimates the end-to-end traffic demand and loss for each source-destination pair of network 108, in particular by finding optimal traffic/loss solutions to a series of simultaneous equations (e.g., via matrix operations) based on the known packet transmission/loss values at each node. The resulting solution for end-to-end traffic demand and end-to-end traffic loss for each source-destination pair can be returned as respective matrices (e.g., traffic matrix, d, and loss matrix, l). In some embodiments, the traffic/loss module 102 can periodically (e.g., every minute) recalculate the solution, for example, based on updated data from network management station 103 and/or an updated model from network modeling module 104 to provide a substantially real-time or near real-time analysis of traffic and loss conditions.

Communications from interface 106 to one or more downstream systems or services 122 can be in the form of network service requests 126. Network services are commonly used in cloud computing. A network service is a software function provided at a network address over the web or the cloud. Clients initiate network service requests to servers and servers process the requests and return appropriate responses. The client network service requests are typically initiated using, for example, an API request. For purposes of simplicity, network service requests will be generally described herein as API requests, but it is understood that other network service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a network service receives the API request from a client device or from the host computer, the network service can generate a response to the request and send the response to the endpoint identified in the request.

For example, downstream system 122 can be a user interface that displays the traffic and/or loss matrices from network monitoring system 100. The user interface can allow an operator or provider of network 108 to take corrective action or to confirm that the network 108 meets performance level standards established by a service agreement with a customer of the network 108. For example, the loss matrix can alert an operator to traffic flows that are experiencing elevated loss. The operator can thus alert a customer, who is the source of or the destination for the impacted traffic flow, to the degraded performance. Alternatively or additionally, the operator can put a portion of the network 108 impacted by the elevated end-to-end loss out of service, for example, to force customer traffic to pass through another part of the network or to allow for repair or troubleshooting. In another example, downstream system 122 can be an alarm module that receives the traffic matrix and/or loss matrix from network monitoring system 100. Based on the data from the network monitoring system, the alarm module can automatically detect which end-to-end paths are non-compliant (e.g., have entries in the loss matrix that exceed a predetermined threshold value) and/or if traffic along an end-to-end path is anomalous (e.g., have entries in the traffic matrix or entries in the loss matrix that deviate from normal operation, even if it may not exceed a predetermine threshold). The alarm module may take corrective action based on the automatic detection and/or provide a notification to an operator of the network or to a customer affected by the degraded end-to-end performance. Other downstream systems or services that can interact with network monitoring system 100 via API 126 are also possible according to one or more contemplated embodiments.

In the simplified example illustrated in FIG. 1, network traffic travels from source node A 110a to multiple destination nodes B-D 110b-110d. The network modeling module 104 determines a packet travel paths from source node 110a to the various destination nodes 110b-110d, for example, using knowledge of the physical topology of network 108 and any routing logic. In the illustrated example, the path A→B to destination node 110b is simply the communication link directly connecting source node 110a to node 110b. For destination node 110c, the path A→C is determined as the combination of A→B with the communication link directly connecting node 110b to node 110c. For destination node 110d, the path A→D is determined as the combination of A→C with the communication link directly connecting node 110c to node 110d.

The traffic/loss module 102 can then determine a series of simultaneous equations based on the packet transmission rate and packet drop rate reported by the agents 112a-112d of each node 110a-110d. For example, agent 112a reports to network management station 103 that source node 110a had a packet transmission rate 118a of 10 packets per unit time (e.g., packets per minute). Agent 112b reports to network management station 103 that node 110b had a packet transmission rate 118b of 7 packets per unit time, but also had a packet loss rate 120b of 2 packets per unit time (e.g., packets per minute). Similarly, agent 112c reports to network management station 103 that node 110c had a packet transmission rate 118c of 4 packets per unit time, but also had a packet loss rate 120c of 1 packet per unit time.

Using the individual packet transmission/loss rate information, the traffic/loss module 102 can build bounding equations for the traffic demand. For example, since traffic from source node 110a may be destined for any of downstream nodes 110b-110d, the transmission rate 118a is inferred to be the sum of traffic destined for respective nodes 110b-110d, i.e., A→B+A→C+A→D=10. Similarly, since traffic from node 110b may be destined for any of downstream nodes 110c-110d, the transmission rate 118b is inferred to be the sum of traffic destined for respective nodes 110c-110d. However, node 110b also drops packets that would otherwise be transmitted to downstream nodes 110c-110d. Thus, the packet loss rate 120b is added to the transmission rate 118b to determine the downstream traffic, i.e., A→C+A→D=7+2. Similarly, since traffic from node 110c is destined for downstream node 110d and node 110c drops packets that would otherwise be transmitted to downstream node 110d, the packet loss rate 120c is added to the transmission rate 118c to determine the traffic to node 110d, i.e., A→D=4+1. The traffic/loss module 102 can then solve these simultaneous equations to determine particular traffic demands, i.e., A→D=5, A→C=4, and A→B=1. Thus, unlike conventional traffic matrix determinations, the above determination by the traffic/loss module 102 takes into account packet loss at each node, thereby providing a more accurate estimate of end-to-end traffic flows.

The bounding equations for the traffic loss can be built in a similar manner as the traffic demand. For example, the loss of A→B can be inferred based on the determined traffic demand A→B in combination with the transmission rates 118a, 118b and loss rate 120b. In this case, the transmission rate 118a is 10, and the sum of the transmission rate 118b and loss rate 120b is 9, thereby suggesting that only 1 packet per unit time ends its travel at node 110b. Since traffic demand A→B was previously determined to be 1, this suggests that there is no end-to-end packet loss from source node 110a to destination node 110b, i.e., loss (A→B)=0. Since 1 packet per unit time was dropped by node 110c that would otherwise have been transmitted to node 110d, it can be inferred that the loss from source node 110a to destination node 110d is at least 1 packet per unit time but may be higher based on packet loss 120b at node 110b, i.e., loss (A→D)≥1. Finally, the loss rates 120b, 120c reflect lost packets that would otherwise have been transmitted to downstream nodes 110c, 110d. The end-to-end loss from source node 110a to respective destination nodes 110c, 110d would thus be equal to the loss rates 120b, 120c, i.e., loss (A→C)+loss (A→D)=2+1. The traffic/loss module 102 can then determine an optimal solution for loss (A→C) and loss (A→D) that minimizes error.

A similar analysis would be repeated by traffic/loss module 102 for each source node (e.g., node B as source node, node C as source node, etc.) in network 108 to fully characterize traffic demand and loss between each source-destination pair. Such analyses by the traffic/loss module 102 may occur in parallel and thus take advantage of matrix operations to solve the simultaneous equations for the traffic demand and traffic loss between respective source-destination pairs. It should be appreciated that the analysis above is greatly simplified, and that practical implementations involving hundreds or thousands of nodes and/or endpoints would be substantially more complex and require significant computing power. Moreover, although the discussion above suggests that the determination of end-to-end traffic occurs before and separate from the determination of end-to-end loss, it should be appreciated that these determinations may be intertwined and thus may be determined at the same time, for example, by using an optimization algorithm to solve for both traffic and loss simultaneously. Since the underlying system of simultaneous equations is generally under-determined (e.g., there are many more paths than nodes), an optimization algorithm may be necessary to determine an optimal solution for both the traffic and loss matrices.

Figure 3:
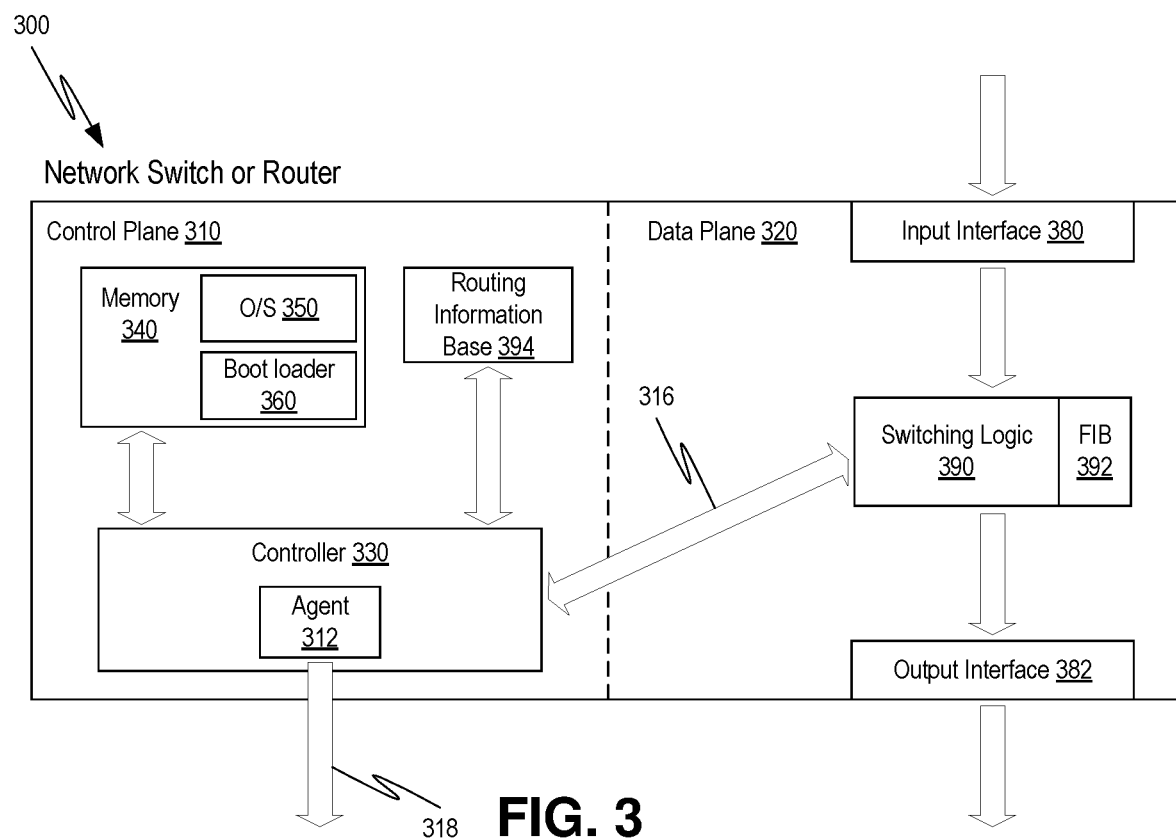
FIG. 3 shows implementation details of an exemplary switch or router employed in the network.

FIG. 3 illustrates further details of a network switch or router 300, which may act as a node 110 in network 108. The router 300 includes a control plane 310 and a data plane 320. The control plane 310 is generally a management layer for configuring, updating, and controlling the data plane 320. The control plane 310 includes a controller 330, which can be a Central Processing Unit (CPU), processor, application-specific integrated circuit (ASIC), microcontroller, or any hardware logic that can receive packets and provide switch management and control in response thereto. The controller 330 has access to a memory 340 that can be a Dynamic Random Access Memory (DRAM), Flash memory, or other type of RAM or ROM. The memory 340 is used to store an operating system 350 and a boot loader program 360, which is a first program executed after a reboot of the controller 330. Although a single memory is shown, the memory 340 can be divided into multiple memories and even memories of different types.

A communications bus 316 allows communications between the controller 330 and the data plane 320. The communication bus 316 can be any desired bus type, such as peripheral component interconnect (PCI), PCI express (PCIe), accelerated graphics port (AGP), etc. The data plane 320 includes input interface or ports 380 and output interface or ports 382 used for receiving and sending network packets, respectively. Interfaces 380, 382 provide network connectivity to/from the router. For example, console and auxiliary ports can be used for managing the router. The routers also have ports for LAN and WAN connectivity. The LAN interfaces usually include Ethernet, Fast Ethernet, Fiber Distributed Data Interface (FDDI), or Token Ring. An attachment unit interface (AUI) port is used to provide LAN connectivity. Alternatively or additionally, the router can be provided with interfaces for asynchronous transfer mode (ATM) as well. The router can also include sync and async serial interfaces, which can be used for WAN connectivity. Alternatively or additionally, the router can include integrated services digital network (ISDN) interfaces, which provide ISDN connectivity can be used to transmit both voice and data.

Switching logic 390 is positioned between the input and output ports. The switching logic 390 includes hardware for switching and can include a routing table, for example, a forwarding information base (FIB 392). The FIB 392 can be programmed by the controller 330 to ensure packets are switched to the proper output port 382. The control plane 310 further includes a routing information base (RIB) 394, which stores prefix information for network devices on the network. The controller 330 can execute regular updates to program the FIB 392 using data within the RIB 394.

Controller 330 may further include an agent 312, which can be a software module that monitor packets transmitted and packets dropped by the network switch or router 300, for example, similar to agent 112 of FIG. 1. In some embodiments, the agent 312 can operate in accordance with SNMP to collect and organize information about the performance of the router 300 in processing packets. For example, the agent 312 can receive information regarding number of packets transmitted and loss via communication bus 316 and can accumulate the information in memory 340. In response to a polling request, for example, from network management station 103 in FIG. 1, the agent 312 can retrieve the accumulated information from memory 340 and send an appropriately formatted message indicating number of packets transmitted and lost in a requested time period. The agent 312 may send the formatted message to the network management station 103 via separate communication link 318 or via the network through output interface 382. In some embodiments, the agent 312 can instead operate in accordance with network or streaming telemetry protocol. In such embodiments, the agent 312 automatically sends information regarding packet transmission and loss rate to the network management station 103 according to a predetermined schedule (e.g., every minute) or continuously.

Figure 4:
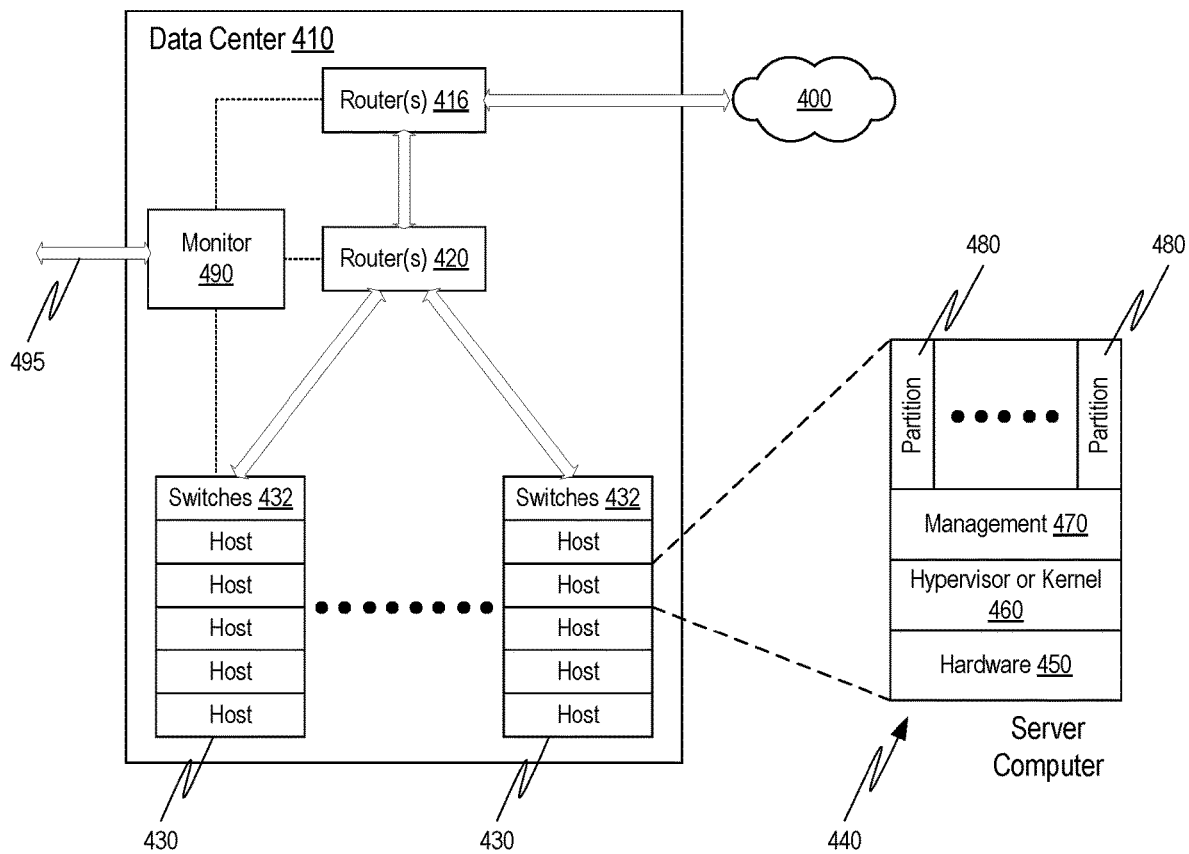
FIG. 4 illustrates an exemplary data center within a compute service provider that transmits packets through a network.

FIG. 4 illustrates further details of a network data center 410. The data center 410 is coupled together by one or more routers 416, which read address information in a received packet and determine the packet's destination. If the router 416 decides that the packet is bound for a border network, then the packet is forwarded to that border network as indicated at 400. If the packet is addressed to a host in the data center 410, then it is passed to one or more additional routers 420, which route the packets to one or more racks of host server computers 430. Each rack can include a switch 432 coupled to multiple host server computers.

A particular host server computer is shown in an expanded view at 440. Each host 440 has underlying hardware 450 including one or more CPUs, memory, storage devices, etc. Running a layer above the hardware 450 is a hypervisor or kernel layer 460, which may be classified as a type 1 or type 2 hypervisor. A type 1 hypervisor runs directly on the host hardware 450 to control the hardware and to manage guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 470 can be part of the hypervisor or separated therefrom and generally includes device drivers needed for accessing the hardware 450. The partitions 480 are logical units of isolation by the hypervisor. Each partition 480 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions. Any applications executing on the instances can be monitored using the management layer 470.

The data center 410 can further include a network monitor 490. In some embodiments, network monitor 490 can operate similar to central network monitor 100 of FIG. 1. Thus, network monitor 490 can receive information regarding packet transmission and loss at each node (e.g., switches 432, routers 418, routers 420, etc.) and can use that information to estimate the end-to-end traffic demand and loss for respective source-destination pairs. Alternatively, in some embodiments, data center 410 is part of a larger network and central network monitor 100 of FIG. 1 operates with respect to that larger network. In such embodiments, network monitor 490 may instead operate similarly to network management station 103 in FIG. 1. For example, network monitor 490 can accumulate information regarding packet transmission and loss at switches 432, routers 418, and routers 420 and can send that information to the central network monitor, for example, via communication link 495.

As noted above, practical network implementations may involve hundreds or thousands of nodes and/or endpoints, which may require substantial computing power to estimate end-to-end traffic flows and losses. Thus, in some embodiments, similarly situated nodes can be grouped together and treated as a single entity for purposes of determining traffic flows and losses in order to reduce computational resources required.

In some embodiments, a topological network map or hierarchical aggregation graph can be assembled for each node of the network and corresponding interfaces between nodes. The graph is generally a topological rank of network devices and/or interfaces based on an attribute such as aggregation level; that is, the network monitoring system may assemble the aggregation graph and rank containers in the graph as having greater or lesser degrees of aggregation. For example, a device may be ranked based on the number of other network devices it is in relation to "within", "beneath" or "above" other network devices. Thus, in some instances, devices with lower levels of hierarchical aggregation may be referred to as "downstream" relative to devices with higher levels of hierarchical aggregation, which may be referred to as "upstream" based on the aggregation of hierarchical communication channels.

The network topology may be abstracted to any one or more aggregated network topologies based on the various classifications of network devices and/or interfaces in the hierarchical aggregation. In some embodiments, hierarchical aggregation of the network devices into containers may include computing a hierarchical graph that includes all the valid aggregations (permutations) of the network devices, interfaces, and/or containers from an edge or a host to a highest topological layer. In an example, the highest topological layer may correspond to the largest aggregation area, for example, a building containing all the network devices. The network devices may be grouped into a respective container based on similarity among the network devices. Alternatively or additionally, the network devices are grouped together based on one or more attributes including, but not limited to, a device type, a device function, and a geographic location. The type of device may include manufacturer details, functionality, and hardware and/or software (e.g., software version) configuration of the device. Alternatively or additionally, the network devices may also be arranged into different hierarchical layers based on the one or more attributes. For example, a layer in the hierarchical graph may include one or more firewalls, while a lower layer may include all the routers connected with the one or more firewalls.

Based on the aggregated network topology for the network devices, a corresponding aggregated topology can be generated based on interfaces of the network devices. For example, interfaces of network devices can be hierarchically aggregated together into "containers" based on a desired level of aggregation and spatial arrangement of the network devices (e.g., the existing organization of the network devices in different layers of the network into respective containers). In some embodiments, the aggregation of interfaces into containers is based on neighbor information from each interface. For example, if a first network device is assigned to a first container (e.g., container A in a first layer) and has an interface that connects to a second network device assigned to a second container (e.g., container B in a second layer), then the interface for the first network device would be assigned to a container representative of that connection (e.g., container A→B). If, however, the first network device and the second network device both belong the same container (e.g., container A in the first layer), then that container is associated with the interface.

Figure 5A:
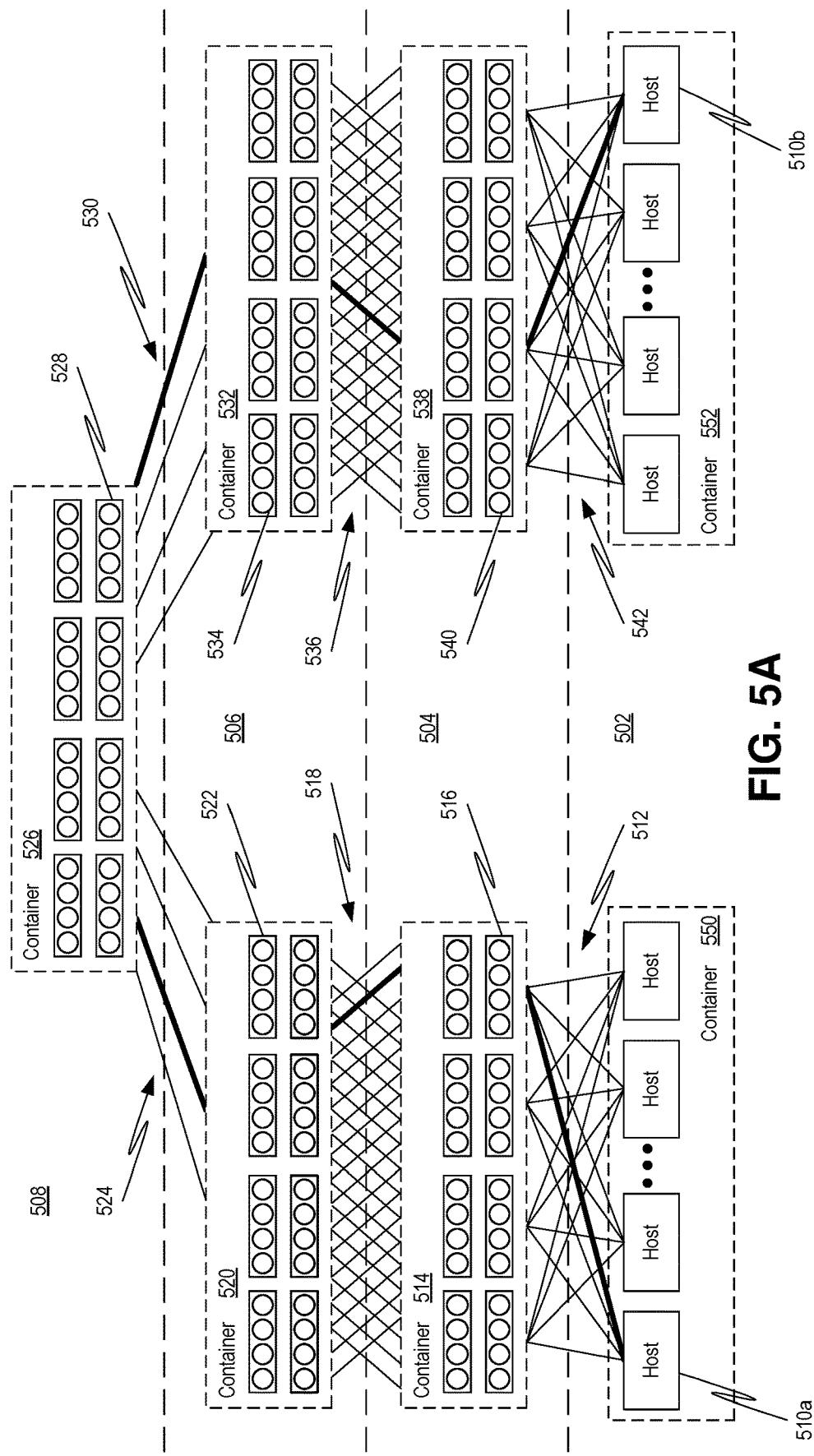
FIG. 5A-5C illustrate examples of different levels of hierarchical aggregation for use in estimating end-to-end network packet loss.

Different aggregation levels may result in different assignments of interfaces to containers. For example, an interface may cross containers at a first aggregation level and otherwise be contained within a single container at higher aggregation levels. FIG. 5A shows an exemplary hierarchical aggregation of interfaces into containers at a first level of aggregation. The hierarchical aggregation of interfaces can be based on the physical topology of the network (e.g., the network layer 502-508 where the network device resides) as well as its connection between network layers (e.g., link connects to a same container in an adjacent level In the illustrated embodiment of FIG. 5A, all of the links 518 from interfaces 516 in container 514 connect to respective interfaces 522 in container 520, and all of the links 524 from interfaces 522 in container 520 connect to respective interfaces 528 in container 526. Similarly, all of the links 536 from interfaces 540 in container 538 connect to respective interfaces 534 in container 532, and all of the links 530 from interfaces 534 in container 532 connect to respective interfaces 528 in container 526. The hosts in layer 502 may also be aggregated into respective source or destination containers. For example, hosts 510a (e.g., a source or destination endpoint) can be aggregated together as container 550, which is connected to interfaces 516 in container 514 via respective links 512, while hosts 510b (e.g., a source or destination endpoint) can be aggregated together as container 522, which is connected to interfaces 540 in container 538 via respective links 542.

Measuring the availability of a container (e.g., any of containers 514, 520, 526, 532, 538, 550, 552) may rely on the packet transmission and/or loss experienced at each physical interface. Since data from agents of the network devices may contain both physical and virtual interfaces (e.g., port channels and other aggregations), the data from the interfaces can be filtered based on their properties. Data regarding total packets transmitted and lost by each interface in the container in a particular time period (e.g., each minute) can be sent by the respective agent to a central monitor, e.g., network monitor 100 of FIG. 1.

As illustrated in FIG. 5A, the number of paths between any two endpoints may be large due to path redundancy for resilient design. To determine a path that traffic may take between a particular source-destination pair, a route-tracing function of an active monitoring module of the network can be used. For example, for traffic from source host 510a to destination host 510b in FIG. 5A, the bolded path may be taken by packets traversing the network. By performing a route-trace (e.g., traceroute) for this source-destination pair and extracting the containers seen along this route, a "container path" can be obtained. The sequence of containers and corresponding container links is representative of the customer traffic between the two network endpoints. This assumes that if route-tracing function traverses a particular set of container links between two network endpoints, then all of the interfaces in those containers are reachable by the customer traffic between those endpoints. By understanding the current state of the network and its routing logic, the assumption can be validated or invalidated. The aggregation into containers thus involves capturing the route-tracing functions for a particular type of end-to-end network traffic and then aggregating network devices or interfaces thereof along the captured paths into respective containers as well as container links. A routing matrix can then be formed using the captured paths, which may be aggregated spatially. In some embodiments, additional endpoints adjacent to containers on the paths can be included if the containers have additional interfaces that do not otherwise present in the route-tracing functions.

As an alternative to route-tracing to aggregate interfaces into containers, or in addition thereto, container paths can be obtained by building a hierarchical graph (similar to FIG. 5A) from the network topology and traversing the graph from leaf to leaf based on knowledge of the routing rules within the network. As an alternative to using routing rules of the network, the container paths can be approximated by computing shortest paths on the hierarchical graph, although this may oversimplify traffic patterns and/or remove important edge cases. For each pairing of source-destination endpoints (e.g., source host 510a and destination host 510b), a number of unique paths aggregated to the various levels of the hierarchy are obtained. The packet transmission and loss for each of the containers is also obtained, for example, by averaging the transmission rates and loss rates for each interface in the container to obtain container-level transmission and loss rates. In another example, the packet transmission and loss for each container can be obtained by aggregating the interface metrics together, such that the container transmission is the sum of packets transmitted across all of its interfaces and the container loss is the sum of packets lost across all of its interfaces. The next step is therefore to combine the two together and derive a measure of path loss and demand for the pairings, for example, to determine the traffic matrix and the loss matrix, as described in detail above.

Figure 5B:
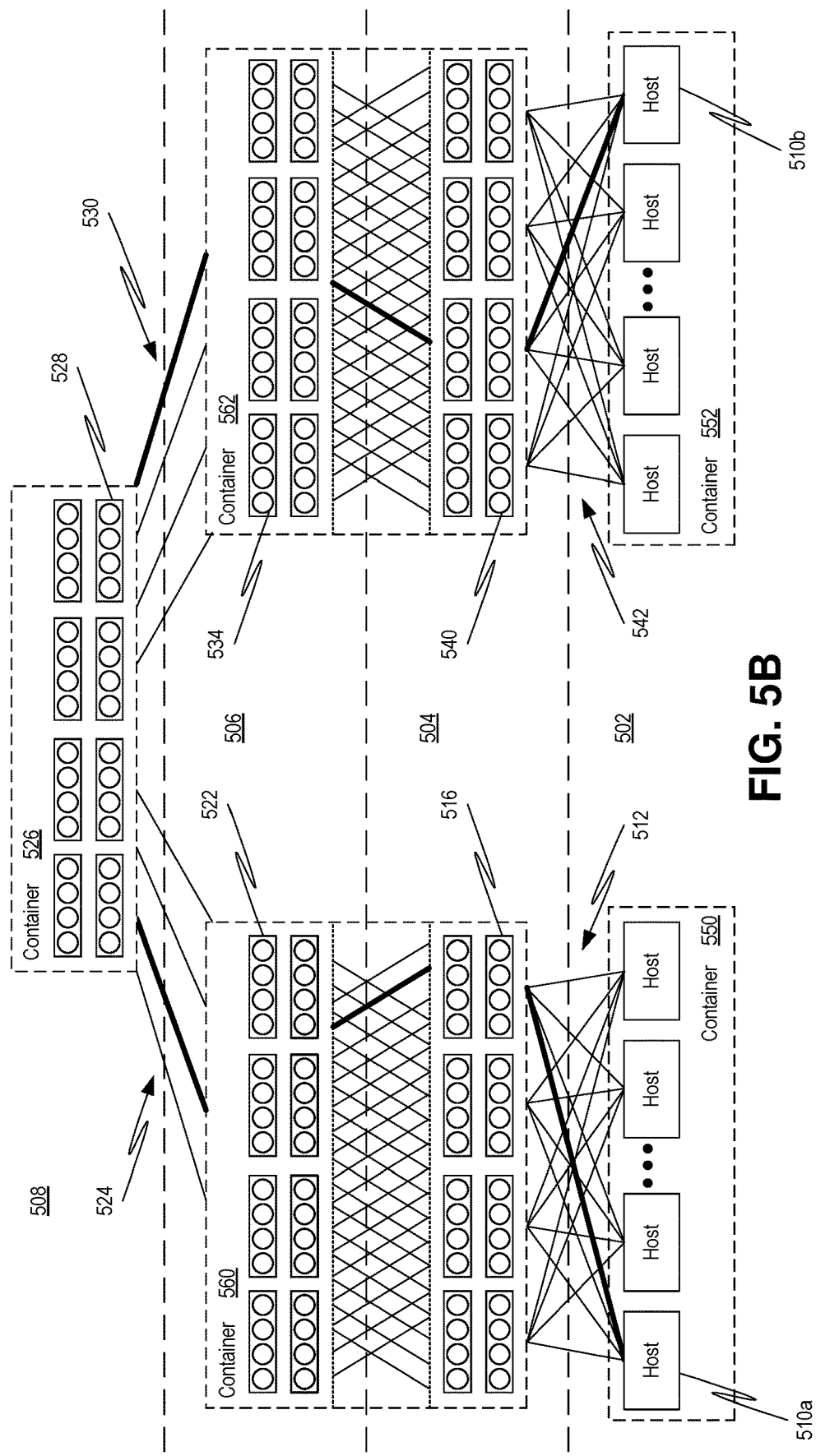

Although five containers are illustrated in FIG. 5A, embodiments of the disclosed subject matter are not limited thereto. Rather, fewer or additional hierarchical levels and/or fewer or additional containers are also possible depending on a desired level of aggregation as well as the number of network layers, the number of network devices, and available interface connections. For example, FIG. 5B shows an exemplary hierarchical aggregation of interfaces into containers at a second level of aggregation higher than the first. Thus, in FIG. 5B, interfaces 516 and 522 are now grouped into a new container 560 that spans network layers 504, 506. Container 560 is connected to host container 550 via connections 512 and to container 526 via connections 524. Similarly, interfaces 534 and 540 are now grouped into a new container 562 that spans network layers 504, 506. Container 562 is connected to host container 552 via connections 542 and to container 526 via connections 530. As compared to FIG. 5A, the processing for the end-to-end path between host container 550 and host container 552 in FIG. 5B may be simplified since it involves traversing only three intermediate containers rather than the five intermediate containers of FIG. 5A.

Figure 5C:
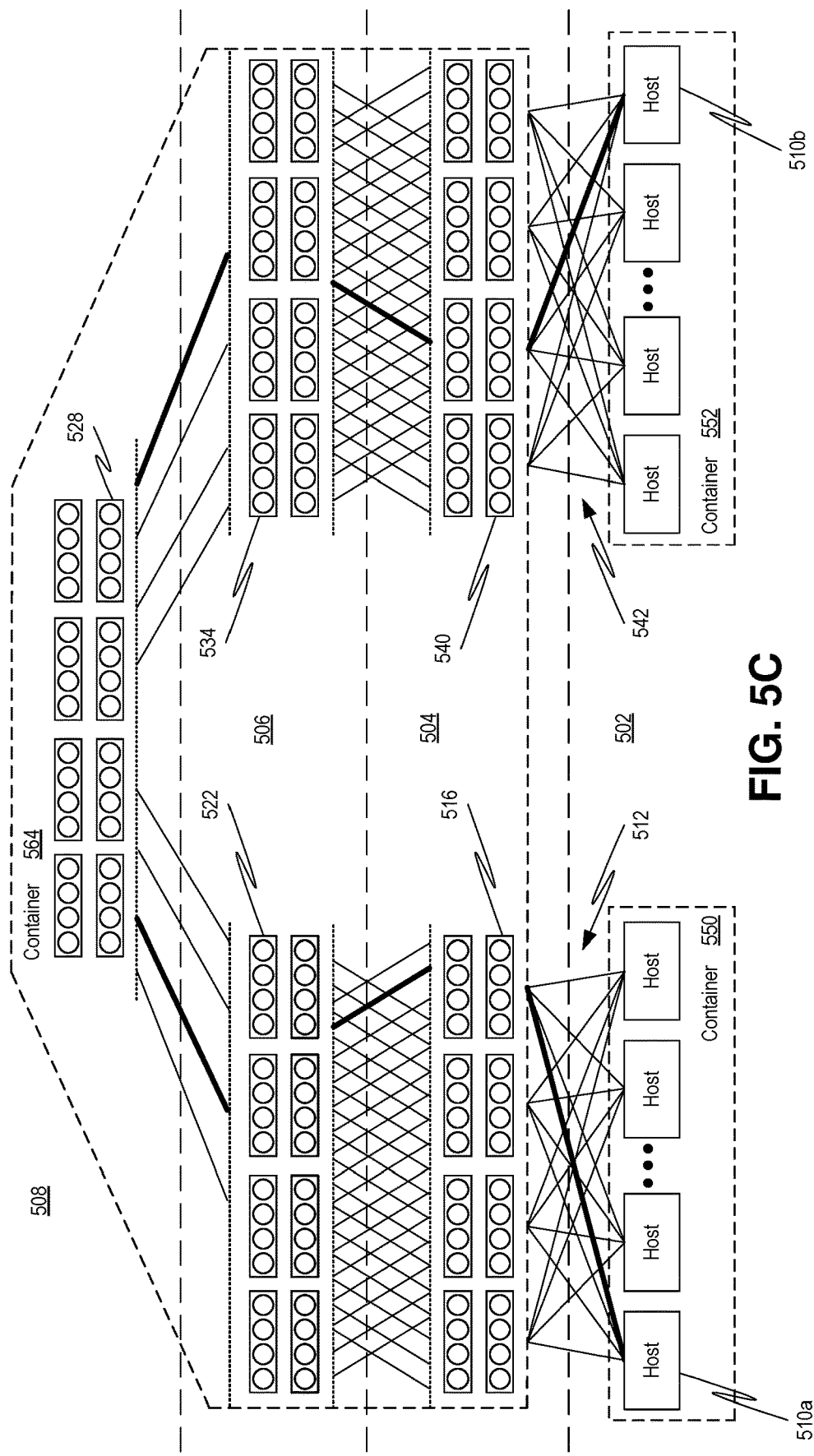

FIG. 5C shows another exemplary hierarchical aggregation of interfaces into containers at a third level of aggregation higher than the second. Thus, in FIG. 5C, all interfaces 516, 522, 528, 534, and 540 in network layers 504-508 are grouped into a common container 564. Container 564 is connected to host container 550 via connections 512 and to host container 552 via connections 542. As compared to FIG. 5B, the processing for the end-to-end path between host container 550 and host container 552 in FIG. 5C may be further simplified since it involves traversing only one intermediate container rather than the three intermediate containers of FIG. 5B.

While higher levels of aggregation may help to simplify processing, such higher levels may produce less meaningful results in estimating end-to-end network traffic demand and/or loss. Indeed, various levels of spatial or hierarchical aggregation may be useful in different application. Each aggregation level can transform a granular topology (e.g., of devices and interfaces) into a corresponding topology of containers and links among them. Accordingly, aggregation may be selected to achieve a balance in processing requirements and coverage of interfaces, depending on the application.

Figure 6:
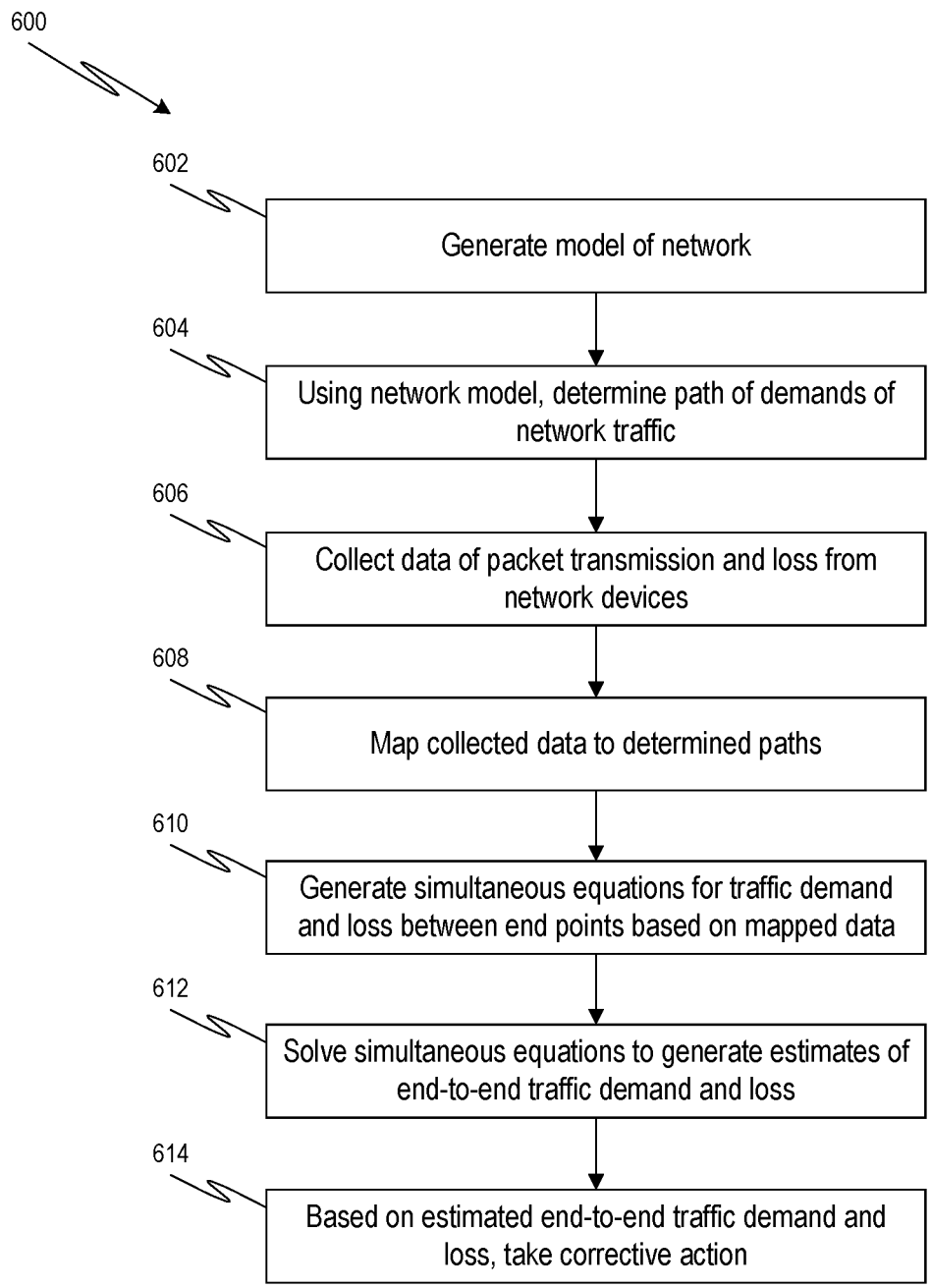
FIG. 6 is a process flow diagram of an exemplary method for estimating end-to-end network traffic demand and loss.

FIG. 6 depicts an exemplary method 600 for estimating end-to-end network traffic demand and loss. The method 600 can initiate at 602, where a model of the network is generated. In some embodiments, the network model can be generated by an active monitoring function, for example, a route-tracing function (e.g., traceroute or tracert) that sends a test packet from a particular source to a particular destination to identify a path through the network that traffic can take for that source-destination pair. Alternatively or additionally, the network model can be generated based on topology (e.g., the location of network devices and physical connections between network devices) and routing logic (e.g., routing or forwarding rules of the network, such as a routing table or forwarding table of each network device). Using the topology and routing logic, end-to-end paths through the network between source-destination pairs can be determined, for example, via simulation or algorithm. The method 600 can then proceed to 604, where the network model is used to determine paths of demands of network traffic, for example, by forming a routing matrix, R, for paths taken by each source-destination pair. In some embodiments, the processes underlying 602 and 604 can be combined. For example, processes 602 and 604 can include hierarchically aggregating interfaces of network devices in the network into respective containers, as described above with respect to FIGS. 5A-5C. The aggregation into containers may simultaneously determine container paths for end-to-end network travel, which container paths can be used to build the routing matrix, R.

The method 600 can proceed to 606, where data regarding packet transmission and loss at each network device (or containers, when interfaces are aggregated into containers) is collected. The packet transmission and loss data can be collected by an agent, for example, agent 112 of FIG. 1 or agent 312 of FIG. 3. The collected data may be periodically (e.g., every minute) or continuously reported by the agent to a central network monitor, such as monitor 100 of FIG. 1. The central network monitor can then, at 608, map the hop-to-hop packet transmission and loss data reported by the agents to the previously determined end-to-end paths. For example, the network monitor can form the data into a matrix, such as the matrix t described above. The mapped packet load and drop data from 608 (e.g., matrix t) is combined at 610 with the routing data from 604 (e.g., routing matrix R) to yield a series of simultaneous equations. For example, the combination at 610 may be expressed in matrix form, e.g., Rs=t, where s is the traffic-loss matrix formed by traffic matrix d and loss matrix l.

The method 600 can proceed to 612, where an optimized solution to the simultaneous equations can be generated, the solution providing estimates of end-to-end traffic loss and end-to-end traffic demand that takes into account packet loss at each hop. For example, when expressed in matrix form, a solution for the traffic-loss matrix, s, can be found that minimizes an error of an optimization problem, as described in detail above. In some embodiments, an iterative algorithm could be used to determine an optimal solution to the simultaneous equations, for example, using a specialized computer program such as parallel Algebraic Recursive Multilevel Solvers (pARMS), Aztec parallel iterative solver library for solving sparse linear systems, or any other available program for solving a series of simultaneous equations.

In some embodiments, the resulting solution (e.g., traffic matrix and/or loss matrix) can be provided to an operator or provider of the network, for example, via an interactive user-interface. The method 600 can proceed to 614, where corrective action can be taken by the system or by the operator/provider of the network based on the estimated end-to-end traffic loss and demand. For example, the system or the operator/provider can notify a particular customer of issues with data transmission to a particular destination, can take out of service network paths between particular source-destination pairs, and/or can identify particular network paths that require repair or further troubleshooting.

Figure 7:
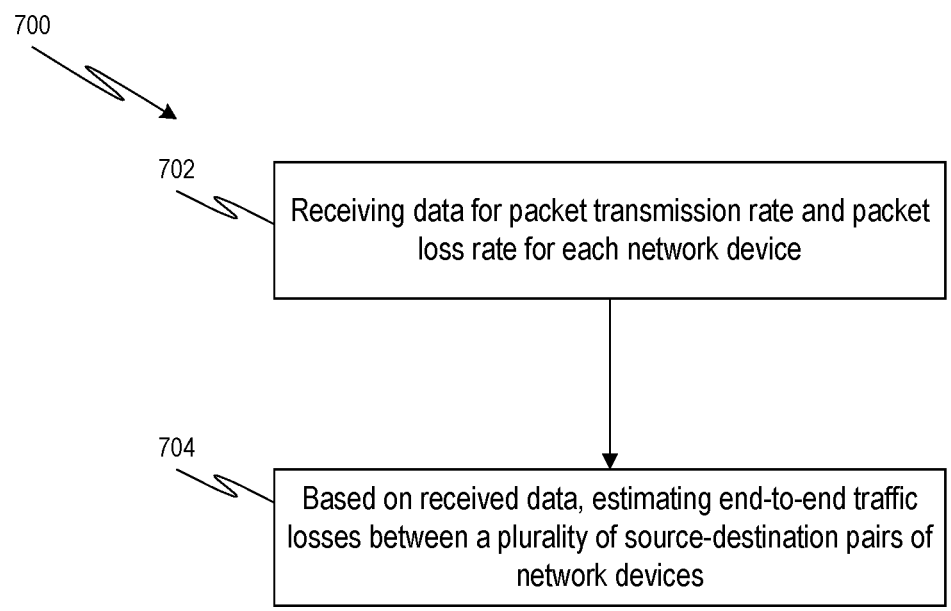
FIG. 7 is a process flow diagram of another exemplary method for estimating end-to-end network traffic demand and loss.

FIG. 7 depicts an exemplary method 700 for estimating end-to-end network traffic demand and loss. The method 700 can initiate at 702, where data for packet transmission rate and packet loss rate (e.g., dropped or otherwise not transmitted due to an error) are received for each network device interface in the network. The data can be collected by an agent, for example, agent 112 of FIG. 1 or agent 312 of FIG. 3. The collected data may be periodically (e.g., every minute) or continuously reported by the agent to a central network monitor, such as network monitoring system 100 of FIG. 1.

The method 700 can then proceed to 704, where end-to-end traffic losses between a plurality of source-destination pairs of network devices is estimated based on the received data. In some embodiments, the end-to-end traffic loss estimation can take the form of determining an optimal solution for a loss matrix, for example, in a manner similar to that described above for FIG. 6. In some embodiments, the traffic loss estimation can simultaneously determine on optimal solution for a traffic matrix.

Figure 8:
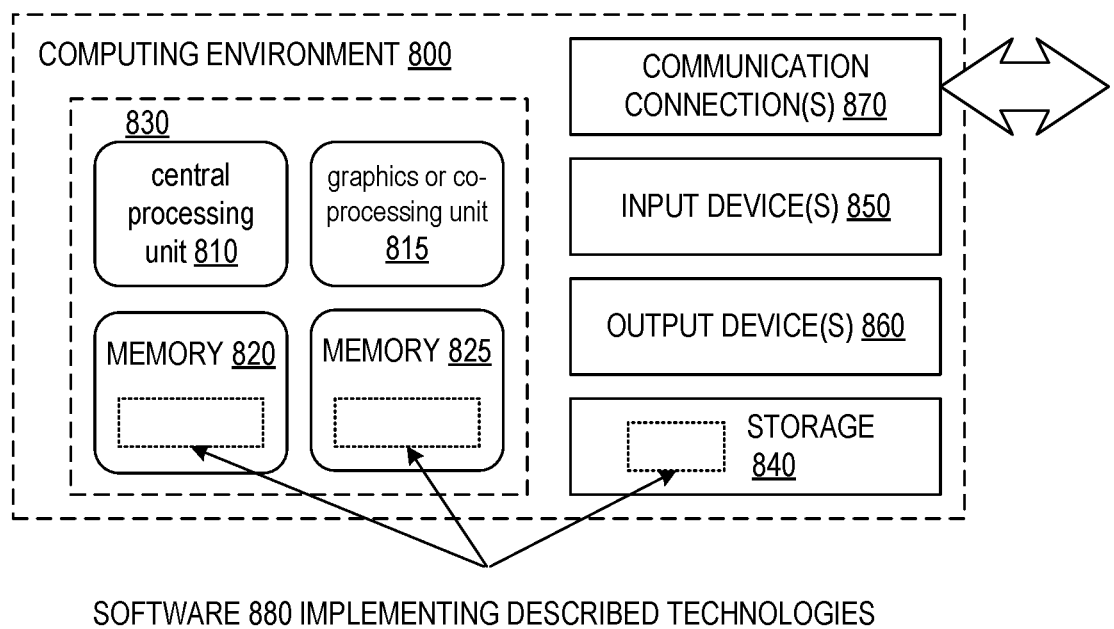
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 is any of a variety of computing devices (e.g., desktop computer, laptop computer, server computer, tablet computer, etc.).

The computing environment 800 includes one or more processing units 810,815 and memory 820, 825. In FIG. 8, this basic configuration 830 is included within a dashed line. The processing units 810, 815 execute computer-executable instructions. Each processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way, and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of monitoring a network having a plurality of network devices, the method comprising:
   generating a model of the network based on logical and physical topology of the network;
   determining paths of data packet transmission through the network between respective source-destination pairs of the network devices;
   receiving data for packet transmission rate and packet loss rate for each network device;
   mapping the received data to the determined paths;
   generating a series of simultaneous equations for traffic demand and traffic loss based on the mapped data;
   determining a solution to the simultaneous equations; and
   based on the determined solution, generating a traffic matrix and a loss matrix,
   wherein the traffic matrix aggregates estimated traffic demands between the respective source-destination pairs of the network devices and takes into account packet loss rate at each network device, and
   the loss matrix aggregates estimated traffic losses between the respective source-destination pairs of the network devices.

2. The method of claim 1, wherein:
   the generating the model of the network comprises hierarchically aggregating interfaces of the network devices into a plurality of containers, each container containing interfaces at one level of a hierarchy that are connected to corresponding interfaces of one of the containers in an adjacent level of the hierarchy; and
   the mapping the received data comprises, for each container, aggregating the packet transmission rates and packet loss rates for the interfaces within the container.

3. The method of claim 1, wherein the generating the model of the network and determining paths of data packet transmission comprises sending probe packets through the network and monitoring paths through the network taken by the probe packets.

4. The method of claim 1, wherein the generating the model of the network and determining paths of data packet transmission comprises using topology of the network and routing logic of the network devices to determine the paths of data packet transmission.

5. The method of claim 1, wherein each network device is a network switch or router.

6. The method of claim 1, wherein the determined solution to the simultaneous equations is an optimized solution that minimizes an error value.

7. One or more non-transitory computer-readable storage media collectively storing computer-executable instructions that, when executed by one or more computer systems, configure the one or more computer systems to collectively perform operations comprising:
   receiving data of packet transmission rate and packet loss rate for each network device in a network;
   based on the received data, estimating end-to-end traffic losses between a plurality of source-destination pairs of network devices;
   determining paths of data packet transmission through the network between the plurality of the source-destination pairs of the network devices;
   mapping the received data for packet transmission rate and packet loss rate to the determined paths of data packet transmission through the network;
   generating a series of simultaneous equations for traffic demand and traffic loss based on the mapped data; and
   determining a solution to the simultaneous equations;
   wherein the estimating end-to-end traffic losses is based on the determined solution to the simultaneous equations.

8. The one or more non-transitory computer-readable storage media of claim 7, wherein the media collectively store additional computer-executable instructions that, when executed by the one or more computer systems, configure the one or more computer systems to collectively perform further operations comprising:
   generating a loss matrix that aggregates the estimated traffic losses.

9. The one or more non-transitory computer-readable storage media of claim 7, wherein the media collectively store additional computer-executable instructions that, when executed by the one or more computer systems, configure the one or more computer systems to collectively perform further operations comprising:
   based on the received data, estimating end-to-end traffic demand between the plurality of source-destination pairs of the network devices, the estimated traffic demand taking into account packet loss at each network device.

10. The one or more non-transitory computer-readable storage media of claim 9, wherein the media collectively store additional computer-executable instructions that, when executed by the one or more computer systems, configure the one or more computer systems to collectively perform further operations comprising:
    generating a traffic matrix that aggregates the estimated traffic demands.

11. The one or more non-transitory computer-readable storage media of claim 7, wherein the media collectively store additional computer-executable instructions that, when executed by the one or more computer systems, configure the one or more computer systems to collectively perform further operations comprising:
    generating a model of the network based on logical and physical topology of the network.

12. The one or more non-transitory computer-readable storage media of claim 11, wherein the media collectively store additional computer-executable instructions that, when executed by the one or more computer systems, configure the one or more computer systems to collectively perform further operations comprising:
    hierarchically aggregating interfaces of the network devices into a plurality of containers to generate the model of the network, each container containing interfaces at one level of a hierarchy that are connected to corresponding interfaces of one of the containers in an adjacent level of the hierarchy; and
    mapping the received data by aggregating the packet transmission rates and packet loss rates for the interfaces within the container.

13. The one or more non-transitory computer-readable storage media of claim 11, wherein the media collectively store additional computer-executable instructions that, when executed by the one or more computer systems, configure the one or more computer systems to collectively perform further operations comprising:

receiving topology information of the network and routing logic of the network devices, and using the topology information and routing logic to determine the paths of data packet transmission between respective source-destination pairs.

14. The one or more non-transitory computer-readable storage media of claim 7, wherein the media collectively store additional computer-executable instructions that, when executed by the one or more computer systems, configure the one or more computer systems to collectively perform further operations comprising:

sending probe packets through the network and monitoring paths through the network taken by the probe packets to determine the paths of data packet transmission between respective source-destination pairs.

15. The one or more non-transitory computer-readable storage media of claim 7, wherein the media collectively store additional computer-executable instructions that, when executed by the one or more computer systems, configure the one or more computer systems to collectively perform further operations comprising:

performing an optimization algorithm to determine the solution to the simultaneous equations that minimizes an error value.

* * * * *